(12) United States Patent
Reisch et al.

(10) Patent No.: US 9,217,506 B2
(45) Date of Patent: Dec. 22, 2015

(54) ACTUATION DEVICE FOR ACTUATING SWITCHING ELEMENTS

(75) Inventors: Matthias Reisch, Ravensburg (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/352,104

(22) PCT Filed: Sep. 13, 2012

(86) PCT No.: PCT/EP2012/067912
§ 371 (c)(1),
(2), (4) Date: Apr. 16, 2014

(87) PCT Pub. No.: WO2013/056904
PCT Pub. Date: Apr. 25, 2013

(65) Prior Publication Data
US 2014/0230591 A1    Aug. 21, 2014

(30) Foreign Application Priority Data
Oct. 17, 2011   (DE) .................. 10 2011 084 583

(51) Int. Cl.
*B60K 17/12* (2006.01)
*F16H 59/02* (2006.01)
*F16H 61/68* (2006.01)
*H02K 11/00* (2006.01)
*F16D 25/04* (2006.01)
*F16D 48/02* (2006.01)
*H02K 16/00* (2006.01)

(52) U.S. Cl.
CPC .............. *F16H 61/68* (2013.01); *F16D 25/044* (2013.01); *F16D 48/0206* (2013.01); *H02K 11/0094* (2013.01); *F16D 2048/0221* (2013.01); *F16D 2048/0278* (2013.01); *F16H 2708/20* (2013.01); *F16H 2708/22* (2013.01); *H02K 16/00* (2013.01); *Y10T 74/19251* (2015.01)

(58) Field of Classification Search
USPC .................................. 74/335, 473.12, 473.1
See application file for complete search history.

(56) References Cited

U.S. PATENT DOCUMENTS

| 3,478,851 | A | * | 11/1969 | Smyth et al. | ................. 192/3.55 |
| 3,880,266 | A | | 4/1975 | Sugahara | |
| 5,235,898 | A | | 8/1993 | Delin et al. | |
| 5,722,297 | A | | 3/1998 | Tischer et al. | |
| 5,890,574 | A | * | 4/1999 | Takahashi | ....................... 192/35 |

(Continued)

FOREIGN PATENT DOCUMENTS

| DE | 298 16 447 U1 | 2/1999 |
| DE | 102 05 411 A1 | 8/2003 |

OTHER PUBLICATIONS

PCT Search Report, Nov. 27, 2012.

(Continued)

*Primary Examiner* — Ha D Ho
(74) *Attorney, Agent, or Firm* — Dority & Manning, P.A.

(57) ABSTRACT

An actuating device is provided for actuating at least one shifting element shiftable through a shifting device, whereas the shifting device features a pressure space with a supply for a pressurized medium, along with a shut-off valve. It is proposed that the shut-off valve is connected in an electrically controllable and torque-proof manner to at least one shifting element, and that the electrical energy for the actuation of the shut-off valve is able to be supplied without contact.

18 Claims, 4 Drawing Sheets

(56) References Cited

U.S. PATENT DOCUMENTS

| | | | |
|---|---|---|---|
| 5,967,285 A * | 10/1999 | Mohan et al. | 192/103 F |
| 6,176,808 B1 * | 1/2001 | Brown et al. | 477/5 |
| 6,578,654 B2 * | 6/2003 | Porter | 180/249 |
| 7,077,256 B2 | 7/2006 | Gratzer et al. | |
| 8,001,865 B2 * | 8/2011 | Muller | 74/372 |
| 8,156,796 B2 | 4/2012 | Fuhrer | |
| 8,196,725 B2 | 6/2012 | Mohr et al. | |
| 8,215,197 B2 | 7/2012 | Mohr et al. | |
| 8,601,893 B2 | 12/2013 | Reisch et al. | |
| 2003/0057050 A1 * | 3/2003 | Bansbach et al. | 192/85 CA |
| 2006/0032721 A1 * | 2/2006 | Langwald | 192/85 C |
| 2007/0145936 A1 | 6/2007 | Simon et al. | |

OTHER PUBLICATIONS

PCT Preliminary Examination Report, Nov. 27, 2012.
German Patent Office Search Report, May 16, 2012.

\* cited by examiner

ACTUATION DEVICE FOR ACTUATING SWITCHING ELEMENTS

FIELD OF THE INVENTION

The invention relates to an actuating device for actuating at least one shifting element shiftable through a shifting device, along with the use of the actuating device.

BACKGROUND

With modern motor vehicle transmissions, in particular automatic transmissions, gears are shifted by shifting elements, i.e. clutches or brakes, designed as multi-disk shifting elements or claw shifting elements. Usually, the shifting takes placing hydraulically, i.e. through shifting devices in the form of piston/cylinder units, which are coated with pressurized oil. The pressurized oil is conveyed by a pump and through oil supplies of the transmission housing through so-called rotating oil feeds, into the rotating gear shaft, and led from it to the shifting devices. Losses that burden the transmission efficiency arise from the hydraulic circuit, i.e. the performance of the transmission oil pump, seals, pressure drops in the supply lines, and leakage. The problem with this system is that losses caused by the hydraulic circuit, in particular by shifting, must be kept as low as possible, in order to achieve the highest transmission efficiency possible. A particular problem is that, in a closed shifting element, the oil pressure in a hydraulic cylinder, the so-called closing pressure, must be constantly tracked, i.e. maintained, in order to be able to deliver the necessary turning moment into the shifting element. This pressure must be applied by a hydraulic pump, which is driven by the engine of the motor vehicle, which brings about losses.

A hydraulically shiftable multi-disk shifting element is known from DE 102 05 411 A1 of the applicant, wherein in a closed state, i.e. upon the transmission of the turning moment, the multi-disk shifting element is mechanically locked by a locking device. Thereby, the contact force between the multi-disks is maintained, without hydraulic pressure having to act—the transmission oil pump is thereby unburdened. In a variant that is not shown in the reference, the locking device is designed as a shut-off valve, which is arranged in the supply area of the hydraulic cylinder. Thus, the pressure space of the cylinder at the pump is shut off, and the necessary pressure is maintained for maintaining the contact pressure in the multi-disk pack. Thus, with this variant as well, if the shifting element is closed, the transmission oil pump is unburdened.

A synchronization for a manual transmission is known from DE 10 2006 049 283 A1 of the applicant, whereas an idler gear is able to be shifted by means of an actuator arranged in a gear shaft, designed as a cylinder/piston unit. The cylinder of the actuator features two pressurized medium lines, in which shut-off valves are arranged, through which the pressure prevailing in the cylinder can be maintained, without the pump having to consume power.

SUMMARY OF THE INVENTION

Starting from this state of the art, the task of the invention is to create an actuating device of the aforementioned type with the smallest possible losses, in particular upon use in transmissions. Additional objects and advantages of the invention will be set forth in part in the following description, or may be obvious from the description, or may be learned through practice of the invention.

The tasks of the invention are solved by the actuating devices described and claimed herein.

In accordance with certain embodiments of the invention, the shut-off valve that maintains the closing pressure in the pressure space of the shifting device is connected in a torque-proof manner to at least one shifting element and is electrically controllable, whereas electrical energy is able to be supplied without contact. The contact-free transmission of power preferably takes place on an inductive basis, whereas a fixed-location primary coil and a co-rotating secondary coil may be provided. This avoids plug connections and mechanical friction losses for the supply of power.

According to a preferred embodiment, the shifting device is able to be actuated hydraulically or pneumatically, i.e. embodiments are not limited to only one pressurized medium.

According to a preferred embodiment, the shifting device is designed as a bellows, which is able to be filled with a pressurized medium. The bellows forms a closed pressure space, in which no seals are necessary. This results in the advantage of an absolute tightness and, through the discontinued use of sealing elements, an efficiency gain. The closing pressure in the bellows is maintained by the shut-off valve.

According to a further preferred embodiment, at least one shifting device is designed as a piston/cylinder unit, which may be coated by a liquid or gaseous medium.

According to a further preferred embodiment, the piston is designed as an annular piston. Thereby, the shifting force generated by the shifting device may be transferred to the shifting element, for example a multi-disk clutch.

According to a further preferred embodiment, the shut-off valve forms a component or a part of an actuator, which also includes an electric motor and a valve spindle, which moves a valve closure element provided with a movement thread. A relatively high closing pressure for the shut-off valve may be achieved through the spindle/nut drive. In accordance with the definition, the actuator (also referred to as an actor) comprises a part of a drive—here, the electric motor—and a valve part (closed body)—here the valve closure element with a valve spindle.

According to a further preferred embodiment, the shut-off valve is a part of an actuator, which comprises a magnetic coil, an armature and a valve tappet, which actuates the valve closure element. Thus, this embodiment of an actuator operates like a magnetic valve with purely translational motion. This ensures a higher closing speed and higher valve dynamics at a lower cost.

According to a further preferred embodiment, an electronic control device, also referred to as an electronics module, is attached to at the at least one shifting element. Electronic components, such as a secondary coil for the contact-free transmission of power and parts of the actuator, are incorporated in the co-rotating electronics module. The electronics module represents a unit that is pre-assembled to the greatest possible extent.

According to a further preferred embodiment, a functional mounting, in which moving parts of the actuator are incorporated and are arranged in floating form in a hydraulic fluid, is connected to at least one shifting element. This achieves compensation for the centrifugal force. Through the hydraulic fluid, the moving parts, such as the valve spindle, armature shaft and valve closure element, experience a buoyant force, which is directed against the operating direction of the centrifugal force.

According to a further preferred embodiment, the average density of the moving parts approaches the average density of the hydraulic fluid, preferably a hydraulic or transmission oil. This can be achieved, for example, through hollow construction (armature hollow shaft) or lightweight construction (plastic or light metal materials).

According to a further preferred embodiment, a power accumulator is provided in the power flow between the actuator and the shifting element; this mechanism has the function by compensating for a diminishing shifting force. This avoids any slipping of the shifting element, for example a multi-disk clutch. The power accumulator may be designed as an elastic element, for example as a disk spring, and/or as an elastic annular piston.

According to a further preferred embodiment, fluid is supplied to the shut-off valve through a rotary signal transmitter, i.e. a device for delivering fluid from a fixed-location component to a rotating component. Advantageously, a single rotary signal transmitter provides fluid to several shut-off valves and shifting devices assigned to them, which reduces the number of rotary signal transmitters causing friction and leakage losses. Thus, multiple shifting elements may be optionally actuated with only one pressure control valve or only one rotary signal transmitter.

According to a further preferred embodiment, the rotary signal transmitter is applied with a pressure level that corresponds to a lubrication pressure level, for example an oil pressure of 0.3 bar. This ensures that, with a closed pressure control valve, if there is no pressure on the rotary signal transmitter, the rotary signal transmitter does not draw any air bubbles. Air bubbles in the hydraulic system would impair reproducible control characteristics. In the case of a transmission, a lubrication pressure level is already available.

According to further preferred embodiments, a contact-free position sensor, with a displacement transducer and an acceptor, is allocated to the electronics module and at least one shifting device. Preferably, the displacement transducer may be arranged in an annular piston of a shifting device, such as a multi-disk clutch. Pressure or force sensors can also be provided. Thereby, the respective operating status of the shifting element (open, closed or intermediate positions) can be recorded. The shift quality can thereby be improved, and a creeping pressure loss in the shifting device is detected and tracked, without this leading to a change to the driver conduct.

According to a further preferred embodiment, a pressure accumulator, which is replenished by an intermittently running electric pump, is provided. Thereby, hydraulic fluid may be provided at a constant pressure level, and the driving power of the hydraulic pump may be reduced.

According to a further aspect of the invention, the actuating device described above is advantageously used in a transmission, in particular an automatic transmission for motor vehicles. This can improve the overall efficiency of the transmission.

BRIEF DESCRIPTION OF THE DRAWINGS

Embodiments of the invention are shown in the drawing and more specifically described below, whereas additional characteristics and/or advantages may arise from the description and/or the drawing. The following is shown.

DETAILED DESCRIPTION

Figure 1:
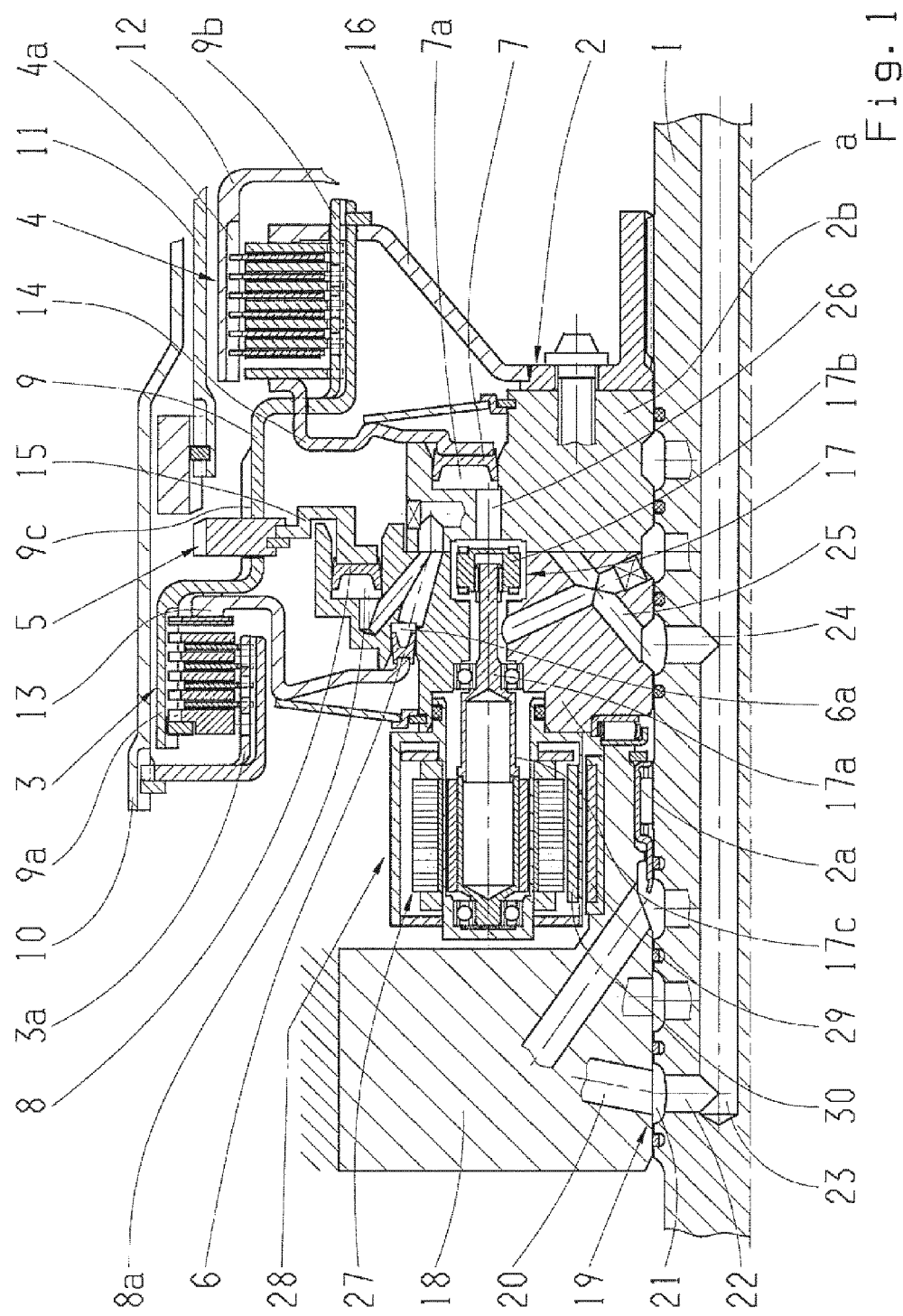
FIG. 1 an axial section of an actuating device in accordance with the invention with a shut-off valve and shifting elements for a transmission, FIG. 2 a hydraulic circuit diagram for the actuation of shifting elements, FIG. 3 an electronics module for incorporating actuators.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows an actuating device in accordance with the invention for an automatic transmission of a motor vehicle with a gear shaft 1, on which a so-called functional mounting 2 with a rotational axis "a" is arranged in a torque-proof manner. A total of three shifting elements, namely a first multi-disk clutch 3, a second multi-disk clutch 4, and a claw coupling 5, are connected to the functional mounting 2. Shifting devices that are able to be actuated hydraulically, designed as piston/cylinder units 6, 7, 8, are allocated to the shifting elements 3, 4, 5. Each of the shifting devices 6, 7 features a ring-shaped ring cylinder designed as a pressure space 6a, 7a, which is arranged in the functional mounting 2. The shifting elements 3, 4, 5 are connected on the drive side through a common, combined multi-disk/claw carrier 9 that, regarding the first multi-disk clutch 3, is designed as an outer multi-disk carrier 9a, regarding the second multi-disk clutch 4, is designed as an inner multi-disk carrier 9b, and regarding the claw coupling 5, is designed as a claw carrier 9c. The output side of the first multi-disk clutch 3 features an inner multi-disk carrier 3a, which is connected to a cylinder-shaped output element 10. The claw coupling 5 is connected to a further cylinder-shaped output element 11. The second multi-disk clutch 4 features an outer multi-disk carrier 4a, which forms the third output element 12. The first multi-disk clutch 3 is actuated through a first annular piston 13, and the second multi-disk clutch 4 is actuated through a second annular piston 14, while the claw coupling 5 is actuated through several shifting arms 15 arranged around the circumference of the functional mounting 2. The combined multi-disk/claw carrier 9 is connected in a torque-proof manner to the functional mounting 2 through a connecting element 16, such that the drive sides of the three shifting elements 3, 4, 5 are connected to the gear shaft 1 through the functional mounting 2. Thereby, the functional mounting 2 is also the mounting of the shifting elements 3, 4, 5.

In accordance with the invention, a shut-off valve 17 is arranged in the functional mounting 2, which comprises two bodies 2a, 2b connected to each other. This shut-off valve controls the pressurized oil supply to the pressure space 7a of the shifting device 7. A so-called rotary oil feed 19, also referred to as a rotary oil exchanger 19, is provided between a (schematically shown) transmission housing 18 and the gear shaft 1; i.e., the pressurized oil is passed from a fixed-housing channel 20 into an annular groove 21 in the gear shaft 1. From there, through a radial hole 22, and axial hole 23 and an additional radial hole 24, the pressurized oil passes into an oil channel 25 of the functional mounting 2, and from there to the shut-off valve 17. From the shutoff valve 17, a pressurized oil channel 26 leads into the pressure space 7a. The pressurized oil supply to the additional pressure spaces 6a, 8a of the shifting devices 6, 8 is shown in part with dotted lines—the associated shut-off valves are not visible in the sectional view, as they are arranged in a manner moving in a circumferential direction. Generally, each shifting device 6, 7, 8 is equipped with a shut-off valve—as emerges below from the explanation of FIG. 2.

The shut-off valve 17 is electrically actuated, in the embodiment shown by the electric motor 27, which is arranged in an electronic control device 28, designed in a ring shape, also referred to as an electronics module 28. The electronics module 28, which features additional functions, is the subject matter of a separate simultaneously filed patent application of the applicant with U.S. application Ser. No. 14/352,095. The subject matter of this simultaneous application is fully incorporated by reference in the disclosure content of this application for all purposes. In connection with the electric motor 27, the shut-off valve 17 forms an actuator, also referred to as an actor. The shut-off valve 17 features a rotating spindle 17a and a valve closure element 17b connected through it to a movement thread. The rotating spindle 17a is connected to a hollow shaft 17c, on which an armature of the electric motor 27 (not shown with a reference number) is arranged. With a rotating functional mounting 2, the moving parts of the actuator, such as the rotating spindle 17a and the hollow shaft 17c, which are arranged parallel to the axis of rotation "a", are subject to a centrifugal force effect, and are therefore arranged in floating form in the pressurized oil, which generates a buoyant force directed against the centrifugal force. The centrifugal force can be compensated for through the design of the movable valve components in terms of form and material. The electronics module 28, in particular the electric motor 27, receives its electrical energy and its signals for closing and opening the shut-off valve 17 on an inductive basis. For this purpose, a primary coil 29 on the housing side (i.e., fixed-location) and, on the other hand, a secondary coil 30 arranged in the rotating electronics module 28, are provided. Additional details of the electronics module 28 are explained in connection with the description of FIG. 3.

The actuating device preferably features a power accumulator, which is arranged in the power flow between an actuator and/or a shut-off valve 17 and a shifting element 4 (and likewise between the other actuators and shifting elements), and acts as an energy reserve upon diminishing contact force in the multi-disk pack. Preferably, the power accumulator is formed as an elastic element, for example as a disk spring, whereas the disk spring may also be integrated into the annular piston 14.

Figure 2:
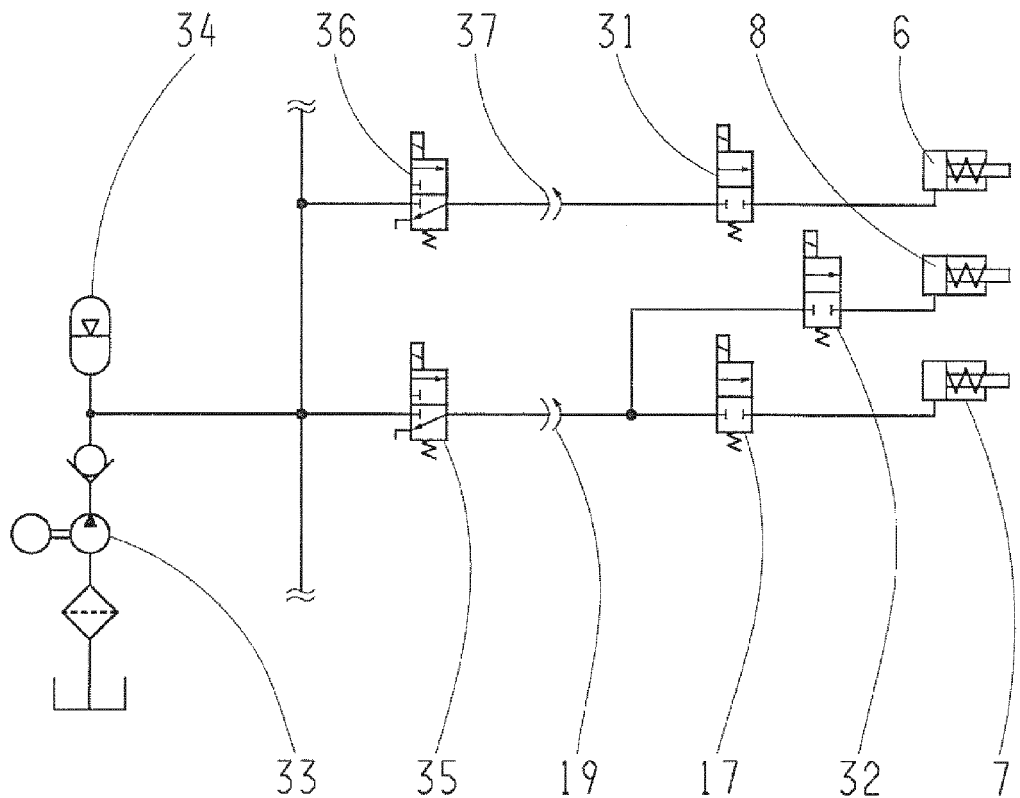

FIG. 2 shows a section from a hydraulic circuit diagram for the shifting devices 6, 7, 8 in accordance with FIG. 1, which are allocated to the shifting elements 3, 5, 7 in accordance with FIG. 1. The shut-off valve 17 in accordance with FIG. 1 is allocated to the shifting device, i.e. the piston/cylinder unit 7. In each case, the shut-off valves 31, 32 are allocated to the shifting devices 6, 8. With the reference number 19 under FIG. 1, a rotary oil supply (also referred to as a rotary signal transmitter), i.e. the oil transfer from the housing into the rotating gear shaft, is designated. An electromotive, intermittently driven transmission oil pump 33, referred to as a pump 33 for short, conveys pressurized oil into a pressure accumulator 34, from which the pressurized oil is supplied through the pressure control valves 35, 36 to the rotary oil exchanger 19 and an additional rotary oil exchanger 37. While the shifting device 6 is supplied by a separate rotary oil supply 37, the two shifting devices 7, 8 are connected in parallel downstream of the rotary oil exchanger 19; i.e., they feature a common rotary oil exchanger 19—thereby, an additional rotary oil exchanger fraught with losses can be spared. Thus, each shifting device 6, 7, 8 is controlled by a separate shut-off value 31, 17, 32, such that, if the clutch is closed, the closing pressure in the pressure space can be maintained, without the pressure accumulator 34 having to be tapped, or the pump 33 having to deliver power.

If the pressure control valves are closed, the rotary oil exchanger 19, 37 is applied with lubricating oil pressure, so that they do not draw in any air bubbles. In the transmission, there is a lubricating oil pressure in the amount of approximately 1.5 bar.

Figure 3:
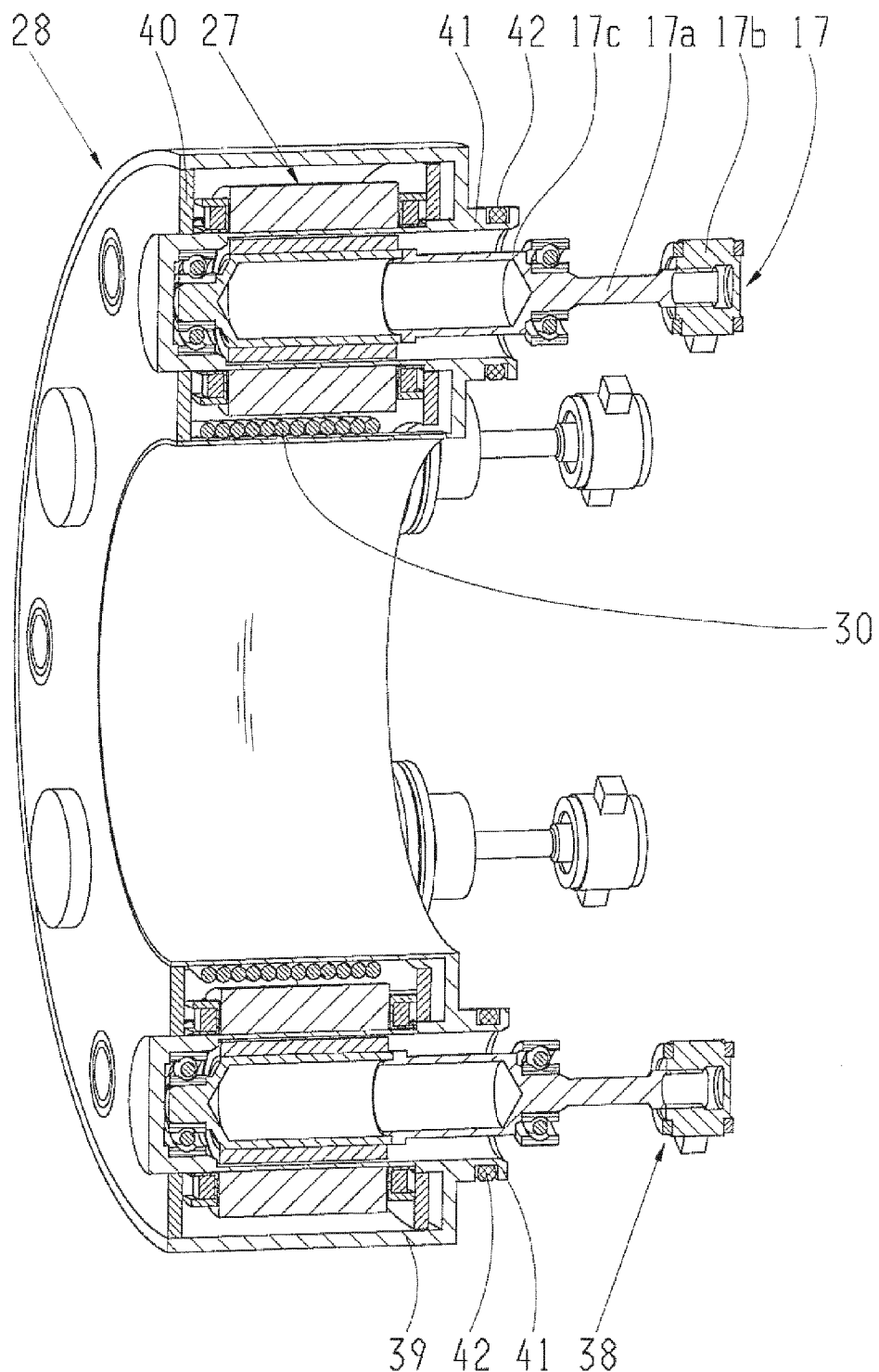

FIG. 3 shows the electronics module 28 as a separate structural unit in a perspective view, whereas two shut-off valves, the shut-off valve 17 shown in FIG. 1 and an additional identical shut-off valve 38 are shown in sections. The electronics module 28 features a housing 39 formed in a ring shape, which is sealed to the outside by a cover 40. The stator of the electric motor 27 is arranged inside the housing 39 (as in FIG. 1, the same reference numbers are used for the same parts). On the housing 39, connection fittings 41 are molded, through which the electronics module 28 is connected to the body 2a of the functional mounting 2 (see FIG. 1). At the same time, a sealing of the housing 39 against the oil chamber in the body 2a of the functional mounting 2 is effected through O-rings 42. In the drawing, four shut-off valves, two with the reference numbers 17, 38, and two more without reference numbers, can be seen. Thus, as a whole, six shut-off valves may be arranged around the circumference of the electronics module 28. As mentioned above, the rotating spindle 17a and the hollow shaft 17c run in oil. On the one hand, they are subject to a centrifugal force effect and, on the other hand, they experience a buoyant force, which is determined by the weight of the quantity of the displaced oil. In order to achieve a maximum buoyant force, the armature shaft 17c is hollow. In addition, materials with low specific weight are preferably used, in order to minimize the centrifugal force effect. As can be seen from the drawing, the hollow shaft 17c is mounted twice. In place of the electric motor 27 for producing a rotating movement, a magnet may also be used in connection with a valve tappet, depending on the type of magnetic valve. The translational motion of the valve tappet is then directly transferred to the closure element. As mentioned above, the transmission of electrical energy is effected on an inductive basis. For this purpose, the secondary winding 30 is arranged within the electronics module 28 in the radial internal area, which is in operative connection with the primary winding not shown here (see FIG. 1).

Additional details regarding the structure and mode of operation of the electronics module 28 may be seen in the simultaneously submitted application of the applicant cited above.

Figure 4:
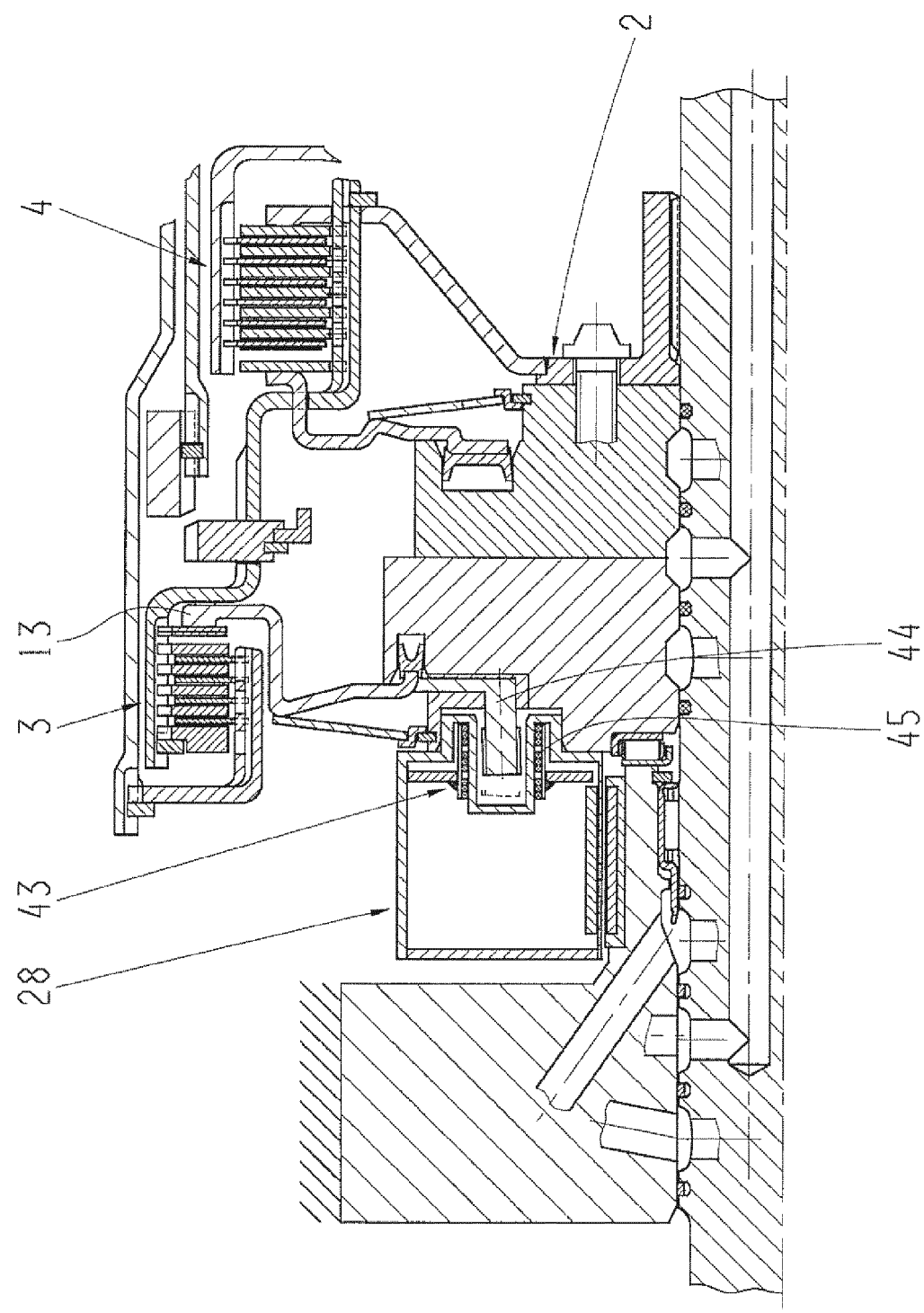
FIG. 4 an axial section through the shifting elements with a contact-free position sensor.

FIG. 4 shows an additional axial section through the functional mounting 2 and the shifting elements 3, 4 (as in FIG. 1, the same reference numbers are used for the same parts). A contact-free position sensor 43 is arranged on the electronics module 28, which operates, for example, according to the method of a differential transformer. The position sensor 43 comprises a transducer pin 44 fixed on the annular piston 13 of the shifting element 3, and an acceptor part 45 designed as a cup arranged on the electronics module 28, in which the transducer pin 44 is immersed. Several such position sensors may be arranged around the circumference of the electronics module 28.

Moreover, additional pressure and/or force sensors can be provided (which is not shown), the signals of which are incorporated by the electronic control device 28.

Figure 5:
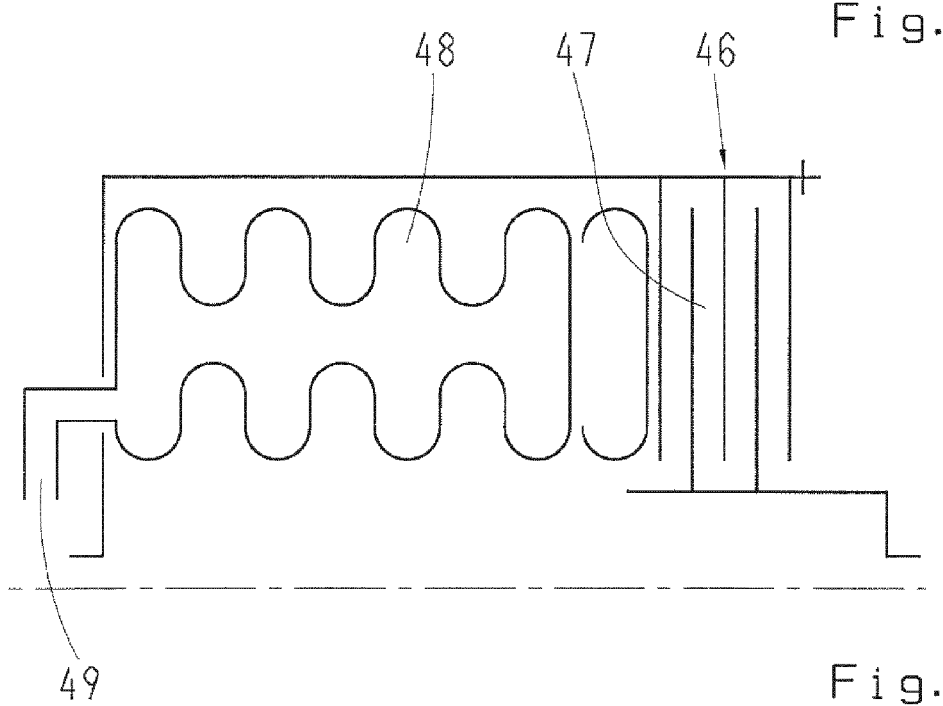
FIG. 5 a shifting device designed as a bellows as a further embodiment of the invention.

FIG. 5 shows, as a further embodiment of the invention, a shifting element 46 with a multi-disk pack 47, which, through a bellows 48, receives the contact pressure necessary for the transmission of the turning moment. The interior of the bellows 48, which is supported on the one hand on the multi-disk pack 47, and on the other hand on the housing of the shifting element 46, is filled with a pressurized medium, pressurized oil or pressurized air, via a supply line 49. In the area of the supply line 49, a shut-off valve in accordance with the invention is arranged (which is not shown). If the coupling is closed, this valve maintains the closing pressure in the bellows 48 and thus provides for a transmission of a constant turning moment. With the bellows, it is advantageous that there is no need for sealing elements in the form of piston rings or O-rings, and that no leakage occurs. Moreover, the bellows 48 can be directly incorporated into the shifting element 46, which eliminates an annular piston and a pressure space in the functional mounting 2 (see FIG. 1).

As mentioned above, the functional mounting is designed as a multi-functional mounting, and may take on even more functions, such as the incorporation of cooling oil and lubricating oil valves for controlling a cooling oil flow for the multi-disk shifting elements, which can thus be cooled according to need. A lubricating oil valve arranged in the functional mounting is the subject matter of a simultaneously filed patent application of the applicant with U.S. application Ser. No. 14/352,095, which is hereby fully incorporated in the disclosure content of this application for all purposes.

Modifications and variations can be made to the embodiments illustrated or described herein without departing from the scope and spirit of the invention as set forth in the appended claims.

The invention claimed is:

1. An actuating device for actuating a shifting element, wherein the actuating device and shifting element are for mounting on a rotating shaft in a vehicle transmission, the actuating device comprising:
   a shifting device operably configured with the shifting element;
   the shifting device comprising a pressure space for receipt of a pressurized medium;
   an electrically controlled shut-off valve disposed so as to maintain pressure in the pressure space of the shifting device; and
   wherein the shut-off valve is configured with the shifting device so as to be supplied with electrical energy in a contact-free manner without electrical transmission lines to the shut-off valve.

2. The actuating device as in claim 1, wherein the shifting device is hydraulically or pneumatically actuated.

3. The actuating device as in claim 2, wherein the shifting device comprises a bellows that is pressurized with the pressurized medium, the bellows connected to the shifting element.

4. The actuating device as in claim 2, wherein the shifting device comprises a piston and cylinder unit.

5. The actuating device as in claim 4, wherein the piston is an annular piston.

6. The actuating device as in claim 1, wherein the shut-off valve is a component of an actuator connected to the shifting device, the actuator further comprising an electric motor, a valve spindle, and a valve closure element.

7. The actuating device as in claim 1, wherein the shut-off valve is a component of an actuator connected to the shifting device, the actuator further comprising a magnetic coil, an armature, and a valve tappet that actuates a valve closure element.

8. The actuating device as in claim 1, wherein the shut-off valve is a component of an actuator connected to the shifting device, and further comprising an electronic control device associated with the actuator, and wherein electronic components for contact-free transmission of electrical energy to the shut-off valve are contained within the electronic control device.

9. The actuating device as in claim 8, wherein the actuator is connected to a functional mounting on a rotating shaft, the actuator further comprising moving parts to actuate the shifting device, and wherein the moving parts are immersed in floating form in hydraulic fluid at least partially within the functional mounting.

10. The actuating device as in claim 9, wherein the movable parts are made of a material and shape so as to have an average density corresponding to that of the hydraulic fluid.

11. The actuating device as in claim 8, wherein the electronic control device comprises a contact-free position sensor having a transducer and associated acceptor.

12. The actuating device as in claim 11, wherein the shifting device comprises an annular piston and cylinder unit, the transducer attached to the annular piston.

13. The actuating device as in claim 8, further comprising an elastic element power accumulator arranged between the actuator and the shifting element.

14. The actuating device as in claim 1, further comprising a rotary oil exchanger to transmit hydraulic fluid from a stationary location to the shut-off valve and shifting device, and further comprising an additional shut-off valve and associated shifting device supplied from the rotary oil exchanger.

15. The actuating device as in claim 14, wherein the hydraulic fluid is supplied to the rotary oil exchanger at a lubrication pressure level.

16. The actuating device s in claim 1, further comprising a pressure sensor disposed to detect shifting pressure of the shifting device.

17. The actuating device as in claim 1, further comprising a hydraulic fluid accumulator that supplies the pressurized medium to the shifting device, the accumulator intermittently filled by a pump.

18. A transmission of a motor vehicle, comprising:
   a rotating gear shaft;
   a functional mounting attached to the gear shaft;
   a plurality of shifting elements contained at least partially in the functional mounting;
   a respective actuating device for actuating each of the shifting elements, the actuating device further comprising:
      a shifting device operably configured with the shifting element;
      the shifting device comprising a pressure space for receipt of a pressurized medium;
      an electrically controlled shut-off valve disposed so as to maintain pressure in the pressure space of the shifting device; and
      wherein the shut-off valve is configured with the shifting device so as to be supplied with electrical energy in a contact-free manner without electrical transmission lines to the shut-off valve.

* * * * *